2 Sheets--Sheet 1.

HENRY CARTER.

Improvement in Ditching Machines.

No. 120,711. Patented Nov. 7, 1871.

Witnesses.
J. H. Burridge.
D. L. Humphrey.

Inventor:
Henry Carter
per Burridge & Co.
Attys

HENRY CARTER.

Improvement in Ditching Machines.

No. 120,711.                               Patented Nov. 7, 1871.

UNITED STATES PATENT OFFICE.

HENRY CARTER, OF AYLMER, CANADA.

IMPROVEMENT IN DITCHING-MACHINES.

Specification forming part of Letters Patent No. 120,711, dated November 7, 1871.

*To all whom it may concern:*

Be it known that I, HENRY CARTER, of Aylmer, in the county of Elgin and province of Ontario, Dominion of Canada, have invented certain new and useful Improvements in Ditching and Trenching Machines, of which the following is a full and complete description, reference being had to the accompanying drawing making part of this specification, in which—

Figure 1:
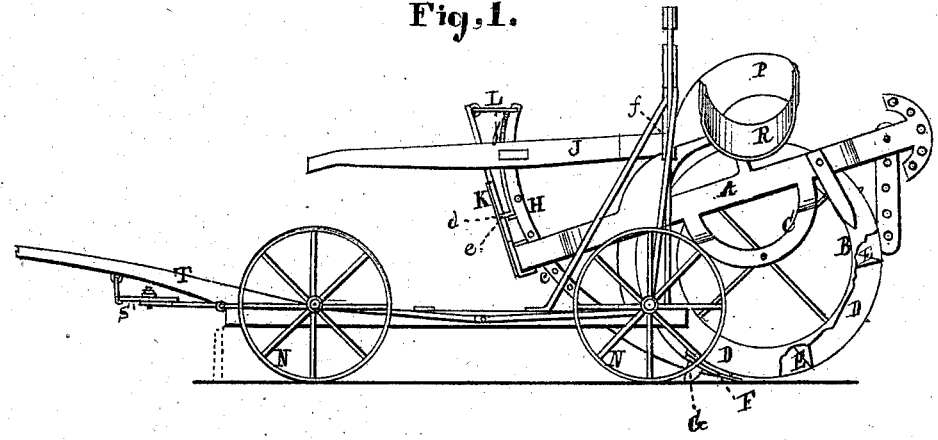
Figure 2:
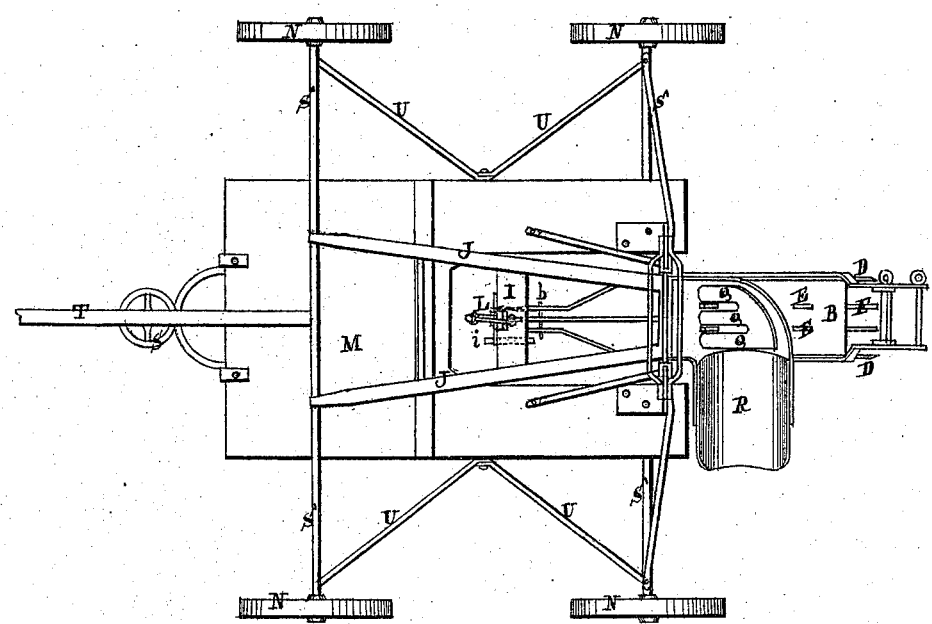
Figure 3:
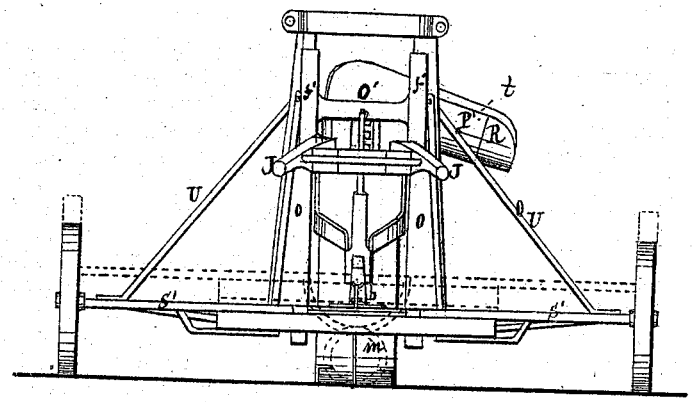
Figure 4:
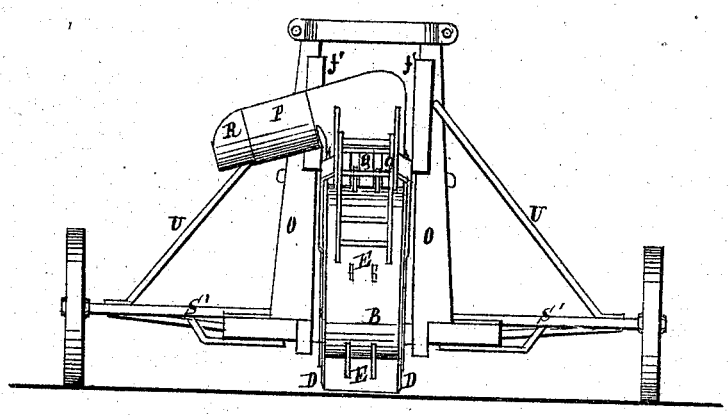

Figure 1 is a side elevation of the machine. Fig. 2 is a plan view. Fig. 3 is a view of the rear end. Fig. 4 is a view of the front end.

Like letters of reference refer to like parts in the several views.

The nature of this invention relates to a machine for cutting ditches or trenches for drainage, &c., by means of a plow operating conjointly with an elevator, whereby the earth is loosened and carried up and thrown out along the side of the trench, the same being an improvement of a similar machine for which a patent was granted to me November 23, 1869, No. 97,164.

A more full and complete description of my improvement is as follows:

In the drawing, Fig. 1, A represents a frame, mounted upon the wheel B and having its axial bearings in the arc C, forming a part of the frame referred to. Proceeding outwardly from each side of the periphery of said wheel is a deep flange, D, Figs. 1 and 4, thereby inclosing the rim of the wheel by two continuous sides having each a sharp cutting-edge. Projecting radially from the face of the wheel is a series of prongs or teeth, E, the purpose of which will hereinafter be shown. F, Fig. 1, is a plow or share projecting under the lower side of the wheel. Immediately back from the point of said plow, and on each side thereof, is a cutter or colter, G, whereby the sides of the trench cut by the plow are smoothed down and made straight with the line of work. The plow above referred to is attached to the frame A by a hinged joint, whereby it is allowed to move back from the wheel and at the same time to be slightly elevated in its relation thereto, so that it may run into the ground at a variable angle, as the nature of the soil may require. Said plow is adjustable in its relation of distance to the wheel by means of a curved standard, H, Fig. 1, the lower end of which is attached to the lower end of the plow, whereas the upper end is secured in the cross-bar I of the lever-handles J, a slot being made therein for its admission, as shown in Fig. 2, and in which the said standard can be moved upward or downward, thereby elevating or depressing the plow to any desired degree, and which is held in any one position by a pin, $b$, inserted in one of the holes $c$, Fig. 1, which prevents the plow from crowding back or drawing forward into the ground, and which is restrained from falling against the wheel by means of the spring-catch K, the lower end of which is fastened to the rear end of the frame A, whereas the upper end is attached to the standard by a hook, L. By means of said hook the notch in the spring is made to engage and hold a point, $d$, projecting from the standard, as shown at $e$, Fig. 1. By this means the plow can be easily and readily adjusted in its relation to the wheel, and at any required angle for entering the ground, and permanently and securely held in such relation thereto. The handles J are pivoted to the frame A at $f$, and the said frame is hinged by the same pivot to the ways $f'$. The said pivot or rod to which the handles J are hinged extend across the ends thereof and through the sides of the frame A, and attached to the ways $f'$ of the cross-head O', which slides up and down upon the frame O to allow the wheel B to dig or work into the ground more or less, as may be required, and for the purpose of adjusting the handles to the convenience of the operator, as he may require them to be more or less elevated for holding them in his efforts to guide the machine. The handles being held in any one position by means of a key, $i$, Fig. 2, inserted in the cross-bar I of the handles, and in one of the notches of the plate $j$ attached to the standard, the lower end of which also forms the point $d$ embraced by the notch of the spring K, above described. M, Fig. 2, is a platform supported on the wheels N. In the front end of said platform the wheel and plow above described are placed and secured in position by a vertical frame, O, mounted upon the platform, and between which the wheel and plow slide upward and downward, as and for a purpose presently shown. P, Fig. 4, is a conductor, one end of which projects beyond the side of the machine, whereas the inner end is fitted between the sides of the wheel and is armed with a series of fingers, Q, between which the prongs or teeth of the wheel pass as the wheel rotates. To the extreme end of the conductor is hinged a lip, R, at the point $t$, whereby the conductor can be extended and also elevated for the purpose of throwing the dirt further from the side of the trench or into a cart arranged thereunder to receive it. At the rear end of the platform is secured an adjustable transverse wheel, $s$, Figs. 1 and 2, also indicated by the dotted lines $m$ Fig. 3. The use of said wheel is to assist the machine in turning round, as will presently be shown.

The practical working of this machine is as follows: The direction of the trench having been determined on the machine is then placed in line therewith, so that the wheels supporting the platform shall be on each side, thereby bringing the wheel and plow directly upon the line of the trench. The team whereby the machine is drawn is hitched thereto by means of a wide double-tree, so that each horse may walk along by the side of the trench and outside of the dirt thrown out by the machine. The operator takes his place on the platform and holds the machine by the handles J. As the machine moves forward the plow E under the wheel loosens up the dirt, which is then taken up by the prongs or teeth of the revolving wheel, and deposits it upon the conductor or chute P, from which it slides onto the ground along the side of the cut. As the depth of the cut increases the wheel and plow descend between the platform, sustained and guided by the standards O, while the platform continues to run upon the ground until the desired depth is obtained.

By this machine a clean, smooth, and even trench is cut, and of any desired depth, with but little fatigue to the operator or to the team.

In my former machine the wheels of the platform or truck were close to the side thereof, in view of which a very wide truck was required in order to allow the wheels to run free of the ditch and the dirt thrown out. The wide truck was sometimes found to be inconvenient, to avoid which I have in my new machine extended the length of the axles S′, as shown in Fig. 2. By this means I am enabled to run the machine free of the ditch and dirt thrown out along the side. Also, in my former machine, the conductor or chute had no adjustable hinged lip; hence the dirt was thrown from the machine at one elevation and at only a certain distance therefrom. But in this my new machine I have a lip, R, hinged to the extreme end of the conductor, which may be turned upward more or less, and thereby discharge the dirt from the machine higher from the ground and at the same time further away from the side of the trench or cut, and which, when not needed, can be turned up out of the way.

A further improvement consists in the manner of adjusting the plow in its relation to the wheel and to the ground, which, as above described, is much more convenient and secure than that employed in my old machine.

In using my former machine I found some trouble in turning it around, for the reason that the axles were rigidly attached to the machine. To avoid which trouble I have introduced into my new machine a caster-wheel, S, which, when the machine is to be turned around, is allowed to roll upon the ground, thereby carrying the front end of the machine about without the front wheels being on the ground, they being lifted up in order to allow the caster-wheel to sustain the weight of the end of the platform for turning it around. Said caster-wheel, when not in use, is hung to the handle T, as shown in Fig. 1. Also, in my old machine, the handles J were attached to the machine in a rigid manner; hence they could not be raised or lowered to suit the convenience of the operator; whereas in my new machine I have hinged them to the frame so that they can be easily and readily adjusted to suit the height of any one that may have to hold them.

What I claim as my invention, and desire to secure by Letters Patent, is—

1. The adjustable lip R, as arranged and hinged to the conductor P, for the purpose specified.

2. The arrangement of the spring K as constructed, standard H provided with a notched plate, $j$, having a point, $e$, and hook L, in combination with the plow F and adjustable handles J, as and for the purpose set forth.

3. The vibrating frame A, adjustable handles J, when hinged or pivoted to the slides $f'$ of the cross-head and operating conjointly in the manner and for the purpose substantially as set forth.

4. The caster-wheel S, when hinged to the front of the platform in the manner as shown and described, for the purpose set forth.

HENRY CARTER.

Witnesses:
W. H. BURRIDGE,
J. H. BURRIDGE.

(114)